No. 806,013. PATENTED NOV. 28, 1905.
S. SMITH.
MEANS FOR SECURING PNEUMATIC TIRES TO RIMS OF WHEELS.
APPLICATION FILED MAR. 2, 1905.
2 SHEETS—SHEET 1.
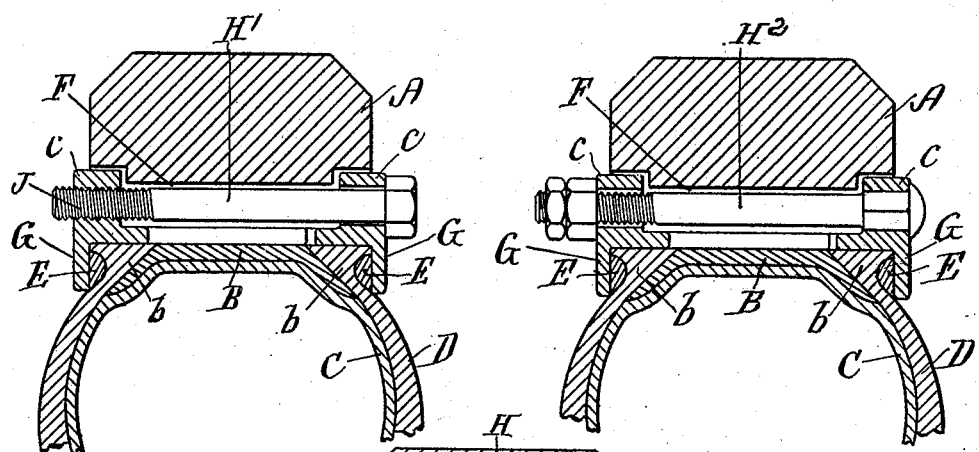
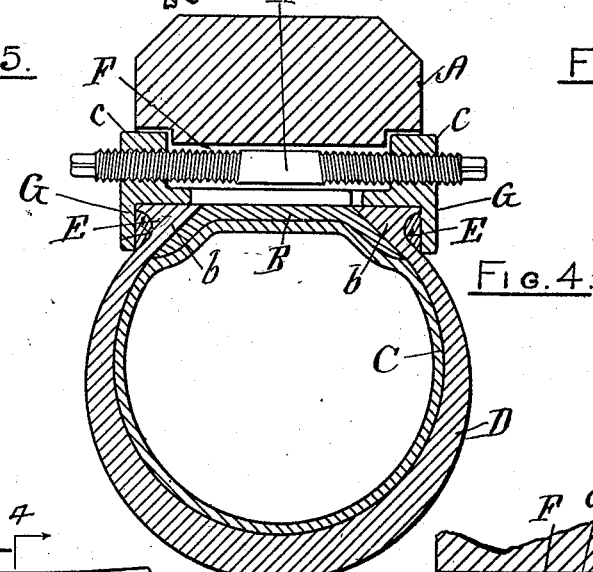
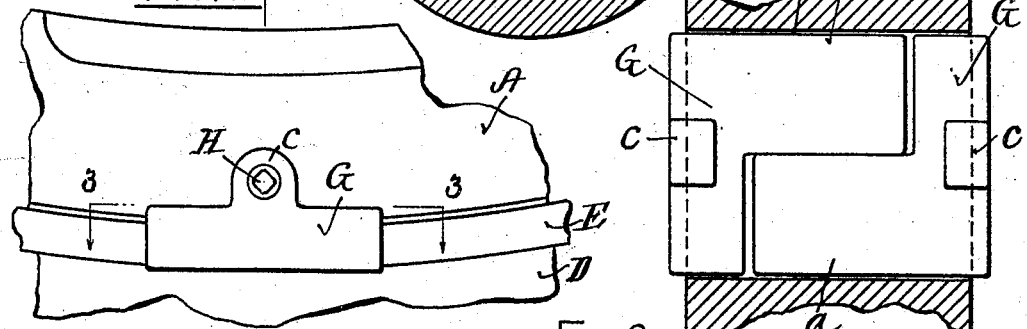
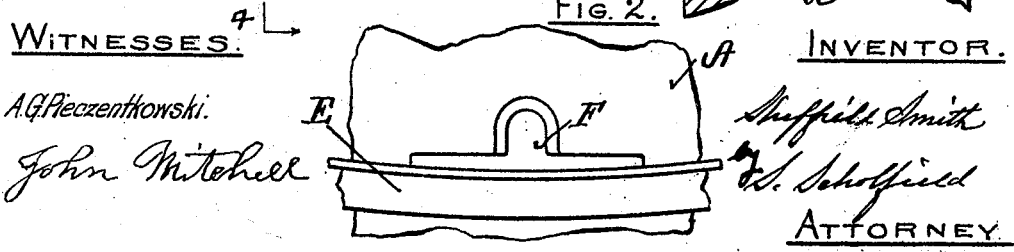

UNITED STATES PATENT OFFICE.

SHEFFIELD SMITH, OF PROVIDENCE, RHODE ISLAND.

MEANS FOR SECURING PNEUMATIC TIRES TO RIMS OF WHEELS.

No. 806,013.  
Specification of Letters Patent.  
Patented Nov. 28, 1905.

Application filed March 2, 1905. Serial No. 248,029.

*To all whom it may concern:*

Be it known that I, SHEFFIELD SMITH, a citizen of the United States, and a resident of Providence, in the State of Rhode Island, have invented a new and useful Improvement in Means for Securing Pneumatic Tires to the Rims of Wheels, of which the following is a specification.

The object of my invention is to provide a simple and convenient means for readily attaching a pneumatic tire to the wheel of an automobile or other vehicle and for readily removing the same therefrom; and my invention consists in the employment of clamping-hooks arranged with their shanks extending inwardly between the metallic tire of the wheel and the felly, with screw-threaded means for operating the hooks to clamp the edge of the cover of a pneumatic tire to the wheel.

Figure 7:
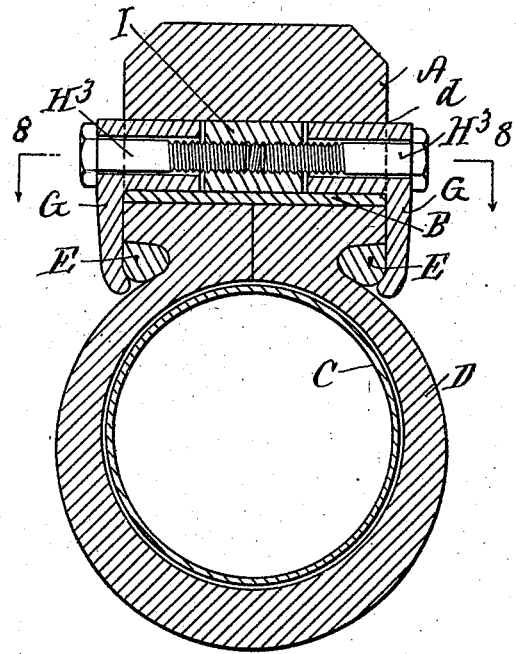
Figure 9:
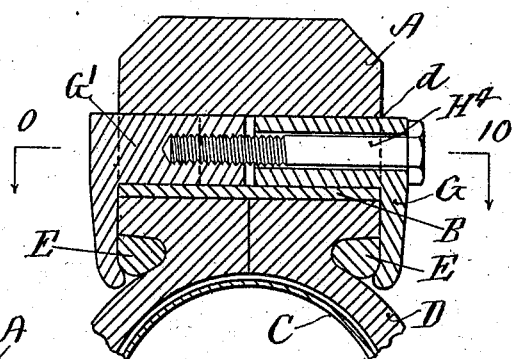
Figure 10:
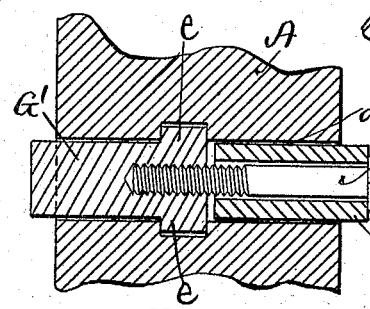
Figure 8:
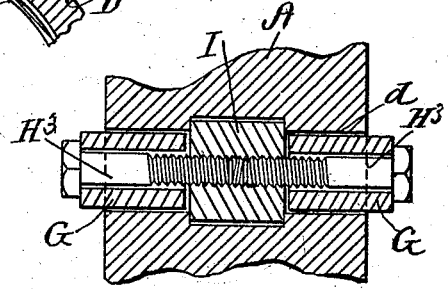

In the accompanying drawings, Figure 1 represents the side of a broken portion of the felly of the wheel and an outer end view of one of the clamping-hooks. Fig. 2 represents the same with the clamping-hook removed, showing the recess formed between the metallic tire of the wheel and the felly to receive the shanks of the clamping-hooks. Fig. 3 represents a section taken in the line 3 3 of Fig. 1, showing a plan view of the clamping-hooks as held in the recess of the felly. Fig. 4 represents a section taken in the line 4 4 of Fig. 1. Fig. 5 represents a section, as in Fig. 4, showing a modification in the form of the clamping-screw. Fig. 6 represents a section, as in Fig. 4, showing another modification in the form of the clamping-screw. Fig. 7 represents a section, as in Fig. 4, showing a modification in the operation of the hooks. Fig. 8 represents a section taken in the line 8 8 of Fig. 7. Fig. 9 represents a section, as in Fig. 4, showing another modification. Fig. 10 represents a section taken in the line 10 10 of Fig. 9.

In the drawings, A represents the wooden felly of the wheel, and B the metallic tire.

C represents the inflatable pneumatic tire, D the cover or shoe by means of which the inflatable tire is protected and attached to the wheel, and E E are metallic rings which serve as supports for the attaching edges of the cover D of the tire.

The felly A is provided at suitable points around the wheel with recesses F, extending from side to side of the wheel between the said felly and the metallic tire B, the said recesses serving to receive the shanks $a\ a$ of the clamping-hooks G G, which shanks extend inwardly between the metallic tire B and the felly A and serve to clamp the edges $b\ b$ of the cover D of the pneumatic tire to the wheel, and, as shown in Fig. 3, the shanks of the said hooks are made to lap by each other in order to provide an extended bearing-surface, which serves to steady the said hooks. The ears $c\ c$ of the hooks G G are provided one with a right-hand and the other with a left-hand screw-thread to receive the corresponding threads of the right and left hand screw H, by means of which the clamping-hooks G G are operated to clamp the edges $a\ a$ of the cover D of the pneumatic tire C to the wheel, as shown in Fig. 4.

A modification of the clamping means is shown in Fig. 5, in which a screw-bolt H′, having a single screw-thread J, is employed for operating the clamping-hooks instead of the right and left hand screw H, and in Fig. 6 another modification is shown, in which an ordinary carriage-bolt H² is employed for operating the clamping-hooks to clamp the cover of the tire C to the wheel.

Another modification is shown in Figs. 7 and 8, in which a nut I is held in the lateral recesses $d\ d$, made in the felly, and separate screw-bolts H³ H³ are employed for operating the clamping-hooks G G.

Another modification is shown in Figs. 9 and 10, in which one of the hooks G′ is provided with lateral projections $e\ e$, which are held in the lateral recesses $d\ d$ of the felly, whereby the said hook will be held stationary at one side of the wheel, while the other hook G will be made movable by means of the screw-bolt H⁴, which enters the tapped-out shank $a$ of the said stationary hook G.

I claim as my invention—

1. The combination of the wheel, and a pneumatic tire, with a clamping-hook, having its shank extending inwardly between the metallic tire of the wheel and the felly, and screw-threaded means also extending inwardly between the metallic tire and the felly, to actuate the said hook to clamping engagement with the edge of the cover of the pneumatic tire, for clamping the said edge to the wheel.

2. The combination of the wheel, and a pneumatic tire, with clamping-hooks having their shanks extending inwardly between the metallic tire of the wheel and the felly, and screw-threaded means for actuating the said clamping-hooks for clamping the edges of the cover of the pneumatic tire to the wheel.

3. The combination of the wheel, and a pneumatic tire, with clamping-hooks having their shanks extending inwardly between the metallic tire of the wheel and the felly, and the right and left hand screw, for actuating the said hooks to clamp the edges of the cover of the pneumatic tire to the wheel.

SHEFFIELD SMITH.

Witnesses:
 SOCRATES SCHOLFIELD,
 JOHN MITCHELL.